(No Model.)

J. RICE.
RAILWAY RAIL CROSSING.

No. 384,717. Patented June 19, 1888.

WITNESSES:
J. W. Garfield
C. Sedgwick

INVENTOR
J. Rice
BY Munn & Co.
ATTORNEY

UNITED STATES PATENT OFFICE.

JAMES RICE, OF PRAIRIE CREEK, INDIANA, ASSIGNOR OF ONE-HALF TO BENONI T. DEBAUN AND JOHN M. TALBOTT, BOTH OF SAME PLACE.

RAILWAY-RAIL CROSSING.

SPECIFICATION forming part of Letters Patent No. 384,717, dated June 19, 1888.

Application filed April 7, 1888. Serial No. 269,950. (No model.)

*To all whom it may concern:*

Be it known that I, JAMES RICE, of Prairie Creek, in the county of Vigo and State of Indiana, have invented a new and useful Improvement in Railway-Rail Crossings, of which the following is a full, clear, and exact description.

My invention relates to a railway-crossing gate adapted to take the place of the stock-guard or cattle-pit ordinarily employed at such crossing, and has for its object to provide a simple and durable device which will effectually prevent large or small stock from escaping up or down the track while crossing, and wherein the device will normally lie flat between the track or tracks, or between the track and the fence usually provided at each side of the former, whereby rolling-stock may pass without interruption.

The invention consists in the construction and combination of the several parts, as will be hereinafter fully described, and pointed out in the claims.

Reference is to be had to the accompanying drawings, forming a part of this specification, in which similar figures of reference indicate corresponding parts in both the views.

Figure 1:
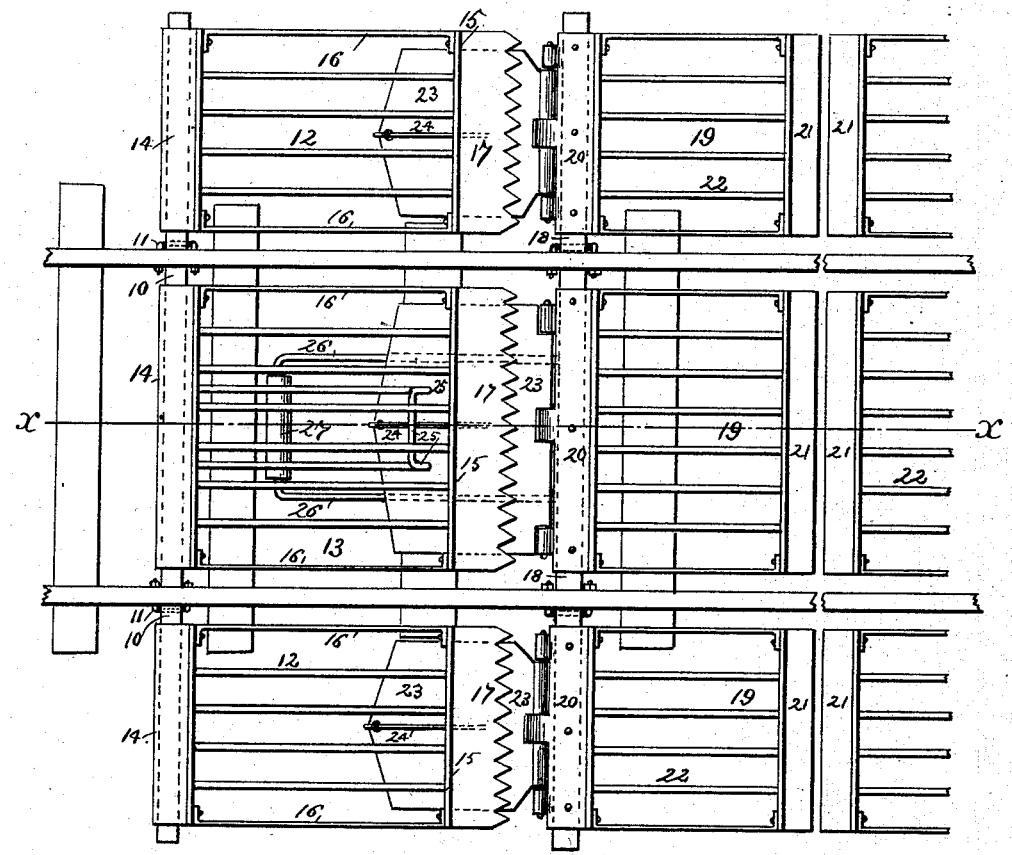
Figure 2:
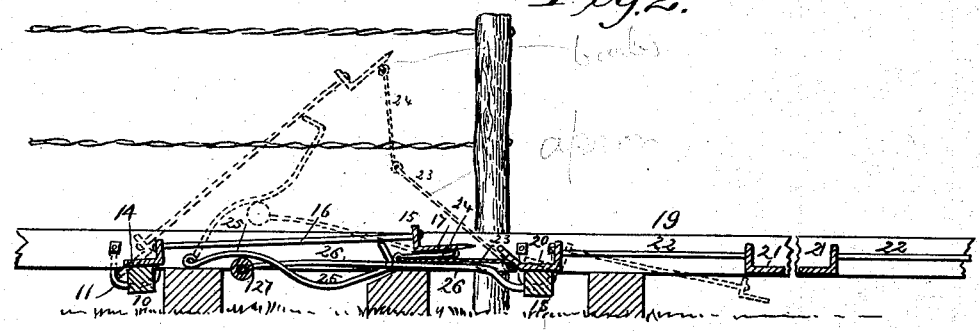

Figure 1 is a plan view of my device applied, and Fig. 2 is a section on line *x x* of Fig. 1.

For convenience I have illustrated my device as applied to a single track; but it may be employed in connection with a double track, if found desirable, and I anticipate such adaptation.

In carrying out the invention a rock-shaft, 10, is journaled transversely across the track a suitable distance at one side of the crossing, the bearings in which said rock-shaft revolves being attached to and suspended from the track, as best illustrated at 11 in Fig. 2.

Upon the rock-shaft 10 gates 12 and 13 are attached, the gate 13 being adapted to close between the rails, and the gates 12 between the said rails and the parallel fences, one gate upon each side. The several gates consist of end angle-irons, 14, which angle-irons are secured to the rock-shaft by means of socket-rods, with or without nuts, or in any other approved manner, whereby they may be readily detached, and a parallel end angle-piece, 15, the two angle-pieces being preferably connected by a series of spaced rods, 16, as best shown in Fig. 2.

From the front angle-piece, 15, of the several gates a transverse barbed strip, 17, is projected. The gates and the rock-shaft sustain such a position to the side of the crossing that the barbs of the strip 17 will be virtually in horizontal alignment with the said crossing.

A short distance in advance of the forward ends of the gates 12 and 13 a second rock-shaft, 18, is journaled in bearings held to the track in a similar manner to the aforesaid rock-shaft 10. Upon the rock-shaft 18 trip-gates 19 are rigidly attached at one end, which trips are preferably rectangular in shape and positioned in similar manner to the gates—viz., one between the tracks and one at each side of the tracks, between the latter and the dividing-fence. These trips ordinarily consist of parallel end angle-plates, 20 and 21, united by a series of bars, 22, in similar manner to the gates.

The gates and the trips may be provided with a sheet-iron cover upon the upper side, if found desirable; but the preferred form is that illustrated in the drawings, the spaced rods affording an effective means for quick disposal of any snow or chaff which may be placed or rest upon the gates or trips. To the ends of the trips adjoining the gates an apron, 23, is pivoted, one apron being provided for each trip, the unattached ends of the aprons being pivotally connected to the under side of the gates by means of links 24.

Upon one of the ties supporting the rails adjacent to the rock-shaft 10, and, preferably, at the center of said tie, a yoke, 25, is pivoted, which yoke, extending in the direction of the free end of the gates, is curved upward to a contact with the under surface of the latter, as best shown in Fig. 2. From the side of the rock-shaft 18 facing the rock-shaft 10 a yoke, 26, is projected, provided at its outer end with a friction-roller, 27, which friction-roller is adapted to engage the under side of the yoke 25.

I desire it distinctly understood that I do not confine myself to the exact construction of the gate or trip-platforms illustrated, as said construction may be varied without departing from the spirit of the invention—as, for instance, the position of the angle-irons shown attached to the rock-shaft may be reversed and strap-irons be substituted at the opposite ends for the angle-irons. I have also in illustrating the device represented fully the same as applied to one side of a railway-crossing only; but it will be readily understood that the device is duplicated upon the opposite side, as indicated by the broken lines in Fig. 1.

In operation, when cattle or stock are led or attempt to cross the track and endeavor to escape either up or down the same, they must of necessity tread or stand upon one of the several trips 19, whereupon the end of the trip, being unsupported, is pressed by the weight of the cattle downward, which action rocks the shaft 18 and elevates the yoke 26. This, being in contact with the gate-yoke 25, elevates the latter yoke also and brings it in contact with the under surface of the central gate, elevating said gate, thereby rocking the shaft 10 and at the same time elevating the gates 12 at each side of the central gate. The gates, being thus held in an elevated position, present their barbed surfaces to the larger cattle and prevent their farther progress, while the aprons, which are carried upward to an inclined position when the gates are elevated, effectually prevent any small animals from passing beneath the gate and thereby up or down the track.

When the gates and trips are in their normal position, they, and likewise the aprons, lie horizontally at each side of and between the tracks, beneath the level of the latter, so as to not impede or be in the slightest degree in the way of a passing train.

Having thus described my invention, what I claim as new, and desire to secure by Letters Patent, is—

1. The combination, with a rock-shaft journaled transversely beneath the track, and trip plates or platforms attached at one end to said rock-shaft, having their other ends unsupported, of a second rock-shaft, also journaled beneath the track to the rear of the first rock-shaft, gates pivoted upon the second rock-shaft, aprons connecting the trip-platform and gates, and means, substantially as shown and described, for elevating the gates from the trip-platforms, as and for the purpose specified.

2. The combination, with a rock-shaft journaled transversely beneath the track, trip plates or platforms secured upon said rock-shaft, and a yoke projecting lengthwise of the track upon the same, of a second yoke attached centrally between the track, resting upon the yoke of the rock-shaft, a second rock-shaft journaled beneath the track in front of the latter yoke, gates secured to the second rock-shaft, and aprons connecting the trip-platforms and gates, substantially as shown and described.

3. The combination, with a rock-shaft journaled transversely beneath the track, and trip plates or platforms attached at one end to said rock-shaft, having their other ends unsupported, of a second rock-shaft, also journaled beneath the track to the rear of the first rock-shaft, gates pivoted at one end upon the second rock-shaft and provided with barbed points at their free ends, aprons connecting the trip-platforms and gates, and means, substantially as shown and described, for elevating the gates from the trip-platforms, as and for the purpose specified.

JAMES RICE.

Witnesses:
J. H. THOMAS,
JAMES W. NEBERGALL.